United States Patent Office
2,893,985
Patented July 7, 1959

2,893,985

POLYMERIZATION OF OLEFINS

Roger Van Nest Powelson, Ambler, Pa., assignor to Sun Oil Company, Philadelphia, Pa., a corporation of New Jersey No Drawing. Application May 15, 1956
Serial No. 584,892

2 Claims. (Cl. 260—94.9)

This invention relates to the polymerization of olefins and more particularly to the production of solid polymers of ethylene.

Processes have been known for the production of polyethylene by catalytic polymerization of ethylene using peroxides or other compounds such as azo compounds which can be thermally decomposed to free radicals which initiate the polymerization reaction. Since the decomposition temperatures of the catalysts are considerably above the critical temperature of ethylene, exceedingly high pressures, up to 3000 atmospheres and above, have been required to maintain the ethylene in a pseudo-liquid condition to insure that the free radicals will collide with an ethylene molecule to activate the same during their relatively short life, to insure that the activated ethylene molecule will collide with a further molecule of ethylene during its life to form an activated dimer, and to insure continuation of the polymerization reaction until polymers of very high molecular weight are formed. The cost of a plant capable of withstanding such high pressures is very large, and the operating cost of the compressors, etc., required to maintain the pressure is correspondingly great.

More recently, processes have been proposed for the polymerization of ethylene in an inert solvent at low temperatures and pressures using as catalysts metal alkyls such as triethyl aluminum or diethyl zinc, alone or in combination with a titanium salt such as titanium tetrachloride. While these processes avoid the high pressures used in the earlier free radical catalyzed processes, it has been found that the polyethylene produced is invariably contaminated by a small amount of the catalyst, so as to adversely affect its dielectric properties.

It is an object of this invention to provide a free radical catalyzed process for the production of polyethylene which is operable at temperatures below the critical temperature of ethylene in order to avoid the high pressures necessary in the free radical polymerization processes of the prior art, while avoiding contamination of the product by catalyst particles.

It has now been determined that if an organic substance which is autoxidizable at temperatures below 10° C. to yield hydrogen peroxide, such as anthrahydroquinone, alkyl derivatives thereof, or durahydroquinone is reacted with oxygen in the presence of a large excess of ethylene in liquid phase at temperatures below the critical temperature of ethylene, free radicals are formed which will react with ethylene to form other free radicals which will then react with other ethylene molecules to initiate a chain reaction leading to the formation of polyethylene.

The autoxidation of anthrahydroquinone, 2-ethyl anthrahydroquinone, 2-tertiary butyl anthrahydroquinone or durahydroquinone to produce hydrogen peroxide is known to the art, and is postulated by me to proceed according to the following mechanism, anthrahydroquinone being used for exemplary purposes.

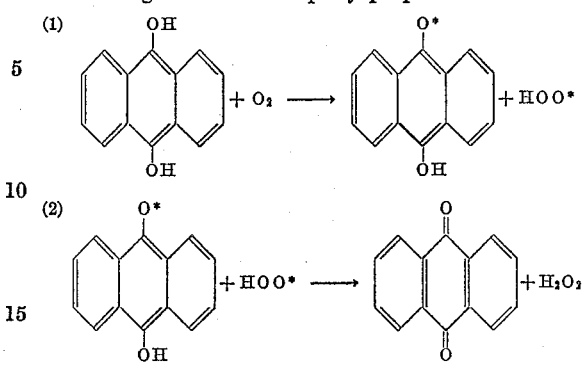

According to the present invention, if Reaction 1 is caused to take place in a reaction medium comprising ethylene in liquid phase, and in which anthrahydroquinone is present in an amount not exceeding 5 mol percent of the ethylene, preferably from 0.01 percent to 2 percent, the perhydroxy radical produced will react to a considerable extent not with the second hydroxyl group of the anthrahydroquinone, but with an ethylene molecule to form a free radical according to the following equation:

(3)    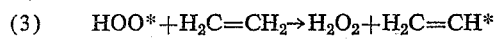
HOO*+H$_2$C=CH$_2$→H$_2$O$_2$+H$_2$C=CH*

This free radical will in turn collide with another molecule of ethylene to produce a four carbon free radical in the following manner:

(4)  
H$_2$C=CH*+H$_2$C=CH$_2$→H$_2$C=CH—CH$_2$—CH$_2$ which is capable of reacting with still another molecule of ethylene to form still another free radical, and this process will continue until very high molecular weight compounds are formed. It is theorized that the reaction continues until two hydrocarbon free radicals collide to form the product.

(5)    
R—CH$_2$*+R′CH$_2$*→R—CH$_2$—CH$_2$—R′

The over-all reaction taking place in accordance with the present invention may then be written:

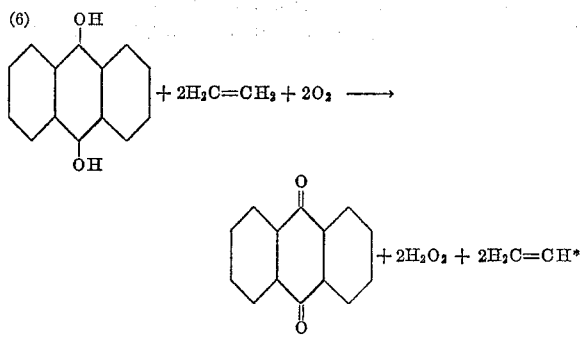

thus forming two hydrocarbon free radicals capable of further reaction with ethylene for each mol of anthrahydroquinone present in the reaction mixture. It will be understood, of course, that there may also be a minor amount of anthraquinone formation via the mechanism of Equations 1 and 2.

In the practice of my invention, I prefer to dissolve the autoxidizable compound, such as anthrahydroquinone in an oxygen-free solvent which is miscible with liquid ethylene, and which is inert under the reaction conditions, such as, for example, a mixture of C$_7$-C$_{11}$ alcohols, and benzene, and to charge the solution to a pressure vessel. Ethylene is then admitted to the vessel at a temperature below its critical temperature, and at a pressure sufficient to maintain the ethylene in liquid phase, to create a reaction mixture comprising anthrahydroquinone dissolved in ethylene. Oxygen is then forced into the reaction vessel in an amount not greater than two mols of oxygen per mol of anthrahydroquinone, while stirring the reaction mixture. While the invention contemplates adding all the oxygen required at this stage of the process, it may be advantageous in some circumstances to add but a portion of the oxygen in the beginning, so as to leave a part of the anthrahydroquinone unoxidized, while still generating sufficient free radicals to initiate the polymerization. Then, after the polymerization reaction begins to slow down, the balance of the oxygen may be admitted to generate further free radicals to carry the polymerization to a higher molecular weight. Alternatively, only a small amount of the ethylene may be added initially, and additional ethylene may be added as the reaction proceeds.

As an example of the present invention, 3 grams of anthrahydroquinone dissolved in a mixture of 10 grams of benzene and 10 grams of a mixture of $C_7$–$C_{11}$ alcohols is placed in a pressure vessel at 10° C. Liquid ethylene, also at 10° C., in the amount of 50 grams, is then placed in the vessel under its autogenous pressure, and the vessel is sealed and placed in an ice bath. Oxygen in the amount of 1.8 mols per mol of anthrahydroquinone is then forced into the reaction vessel while the contents thereof are stirred. A vigorous reaction takes place, as evidenced by a rise in temperature. The reaction vessel is kept in the ice bath until the reaction is complete, as evidenced by a drop in temperature. The vessel is then opened, and about 15 grams of solid polyethylene is recovered.

The present process is operable at temperatures as low as about —40° C., but since the autoxidation of anthrahydroquinone does not proceed rapidly at these low temperatures, quite a long induction period may be experienced before rapid polymerization takes place. Since the reaction is fairly rapid at temperatures between 0° C. and 10° C., such temperatures are preferred. Temperatures above the critical temperature of ethylene may also be used, but such temperatures are not preferred since excessively high pressures are required and the concentration of ethylene in liquid phase as a solution in the solvent used to dissolve the anthrahydroquinone is so low as to unduly reduce the chance of a collision of a perhydroxyl free radical with an ethylene molecule during its life.

While the foregoing description has been concerned primarily with the polymerization of ethylene, the invention is equally applicable to the polymerization of other olefins, such as propylene, butylene, butadiene, styrene, and the like. When treating such olefins somewhat higher temperatures up to 100° C. may be used, and pressures as low as atmospheric may also be used, so long as the temperature-pressure relationship is such as to maintain the olefins in liquid phase during the reaction. High temperatures are generally not desirable if the production of polymers of high molecular weight is desired, but are useful when lower molecular weight products, useful as synthetic lubricating oils, for example, are desired.

The anthrahydroquinones are the preferred reagents for the production of free radicals by reaction with oxygen, since they are readily available in commercial quantities, but durahydroquinone may also be used since, in this compound, the reactive hydrogen atoms attached to the benzene nucleus are replaced by inactive groups, so the compound does not act as a polymerizaton inhibitor, as does hydroquinone.

I claim:

1. A process for the production of polyethylene which comprises dissolving a reagent selected from the group consisting of anthrahydroquinone, alkylated anthraquinone, and durahydroquinone in a substantially oxygen-free solvent which is miscible with liquid ethylene, charging the solution to a reaction vessel, adding ethylene to the solution at a temperature below its critical temperature while maintaining sufficient pressure in the reaction vessel to keep the ethylene in liquid phase, introducing oxygen to the reaction vessel in an amount sufficient to react with the reagent to produce free radicals, whereby to initiate a polymerization reaction, and recovering a polyethylene reaction product.

2. The process according to claim 1 in which the mol ratio of ethylene to the reagent is from about 20:1 to about 10,000:1.

References Cited in the file of this patent
UNITED STATES PATENTS

| | | |
|---|---|---|
| 2,762,791 | Pease et al. | Sept. 11, 1956 |
| 2,820,779 | Dale | Jan. 21, 1958 |

OTHER REFERENCES

Dufraisse et al.: Bull. Soc. Chim. de France, vol. 6 (1939), 1649–56.

Mark et al.: Physical Chemistry of High Polymeric Systems (1950), page 400, Interscience Publishers, New York.